June 13, 1939.  R. C. PIERCE  2,162,357
DRAWING OF WIRE
Filed March 14, 1936    10 Sheets-Sheet 2

INVENTOR.
ROBERT C. PIERCE
BY McConkey & Booth
ATTORNEYS.

June 13, 1939.   R. C. PIERCE   2,162,357
DRAWING OF WIRE
Filed March 14, 1936   10 Sheets-Sheet 6

INVENTOR.
ROBERT C PIERCE
BY
McConkey & Booth
ATTORNEYS.

June 13, 1939.  R. C. PIERCE  2,162,357
DRAWING OF WIRE
Filed March 14, 1936  10 Sheets-Sheet 8

INVENTOR.
ROBERT C. PIERCE
BY
McConkey & Booth
ATTORNEYS.

Patented June 13, 1939

2,162,357

UNITED STATES PATENT OFFICE 2,162,357

DRAWING OF WIRE

Robert C. Pierce, Niles, Mich., assignor to National Standard Company, Niles, Mich., a corporation of Michigan Application March 14, 1936, Serial No. 68,856

22 Claims. (Cl. 205—14)

This invention relates to apparatus for handling wire, and similar materials in strip form, and is illustrated as embodied in a multi-stage apparatus for drawing wire.

An object of the invention is to arrange the machine so that the wire is drawn vertically downward through the dies, thereby facilitating the lubrication of the dies and the handling of the wire. Advantage is preferably taken of this manner of feeding the wire to pass it in a vertical plane over drawing capstans and guide members arranged in that plane below and above the dies, thereby greatly reducing the floor space required for the machine.

The speed of drawing through the successive dies is preferably varied in accordance with the vertical positions of the guide members, which are movably arranged above the respective dies, and which are connected to control the speed of the capstans, to compensate for the elongation of the wire as it passes through the successive dies. Various features of the invention relate to the structure, arrangement, and control of the speed-varying means, to render the feeding of the wire accurately compensated so that it goes smoothly through the machine in a continuous operation.

To this end a motor or the like may drive the feeding mechanism through a variable speed drive means which is controlled automatically by a movable auxiliary frame or the like carrying a roll about which the wire passes, and which is urged yieldingly by a spring or weight (which may, if desired, be the weight of the motor) in a direction to give the desired back tension on the wire.

The illustrated variable speed drive means is of the type in which a V-belt is driven by a pulley made up of spring-pressed conical halves, so that shifting the motor relatively to the belt varies the effective diameter of the pulley.

One of the advantages of the above novel features is that they can be combined in a multi-stage apparatus, made up of a number of units through which the wire passes successively. One of the difficulties in designing such an apparatus has been that, since each die reduces the diameter and increases the length of the wire, the units must be driven at different speeds which must nevertheless be very carefully correlated.

It will be seen that by combining units embodying my improvements, the speed of the first unit may be controlled manually, whereupon all the other units automatically adjust their speeds to correspond, although the speeds of the successive units are successively greater, since each unit selects its own speed under the control of the tension on the wire.

Various parts and subcombinations of mechanism in the apparatus, particularly in the wind-up mechanism for the finished wire, and in the particular means for guiding and controlling the wire and its feed mechanism as the wire passes through the apparatus, embody substantial novelty and utility. These, and various other new features and desirable combinations of parts, are explained below in describing three illustrative embodiments of the invention shown in the accompanying drawings, in which:

Figure 8 is a section on the line 8—8 of Figure 7;

Figure 1:
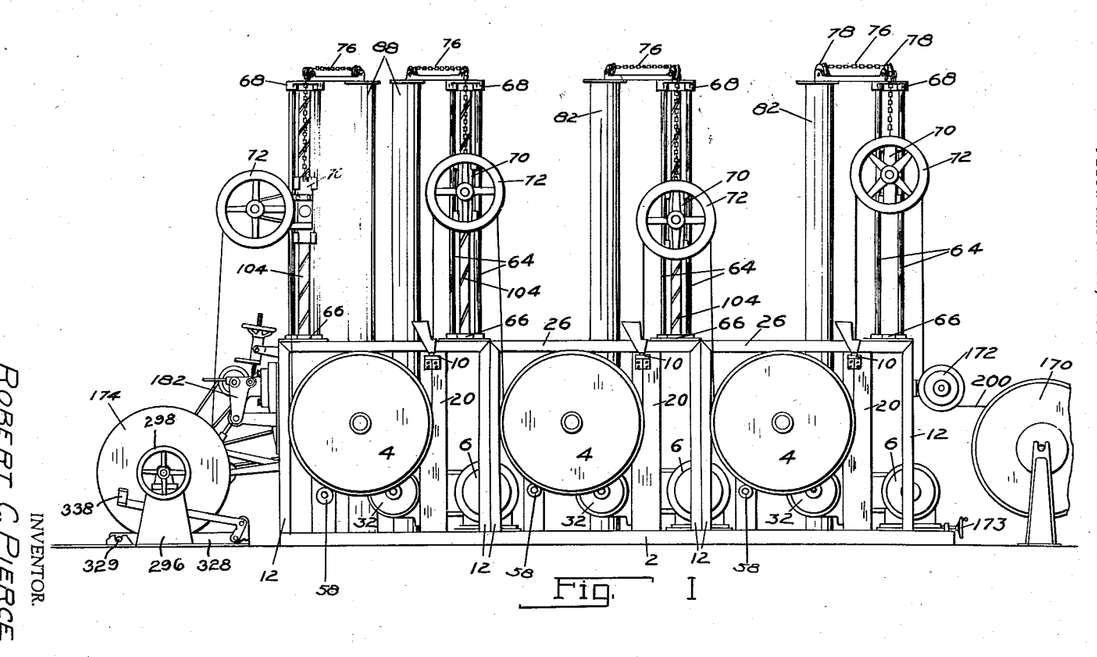
Figure 1 is a front elevation of the preferred embodiment of my invention illustrating the combination of three units.

The preferred embodiment of my invention is illustrated in Figures 1 to 8 and may be made up of a plurality of similar units, three being shown in Figure 1. For convenience each of these units may have a separate frame and these frames may be cast or, as illustrated, be made up of welded structural members. The units may be mounted on a common base 2, and each unit preferably embodies as principal elements a capstan 4 adapted to be driven by a motor 6 of the constant speed type, a wire-drawing die 8 (Figure 2) provided with a holder 10, and means (described below) serving the triple purpose of preloading the wire before drawing, wire slack take-up and speed control for the motor of the respective unit.

One of the intermediate units, as illustrated in Figures 2 to 6, will first be described in detail and thereafter certain adaptations required in the first and last units will be pointed out.

Referring particularly to Figures 2 to 6, two angle members 12 constitute corner posts of the unit frame and are supported on the common base or platform 2. A pair of horizontally arranged angles 14 provide supports for two bearings 16. In these bearings is journalled a shaft 18 on which the capstan 4 is drivably mounted externally of the bearings and frame. A vertical channel member 20 adjacent the periphery of the capstan provides a mounting at its upper end for the die holder 10, and one of the members 14 is bridged between this channel and one of the corner posts 12. The other member 14 is independently supported by vertical angle members 22 and 24 extending upwardly from the base 2. A horizontal angle member 26 is welded to the upper ends of the corner posts 12 and the angle member 20.

Figures 2, 5, 6:
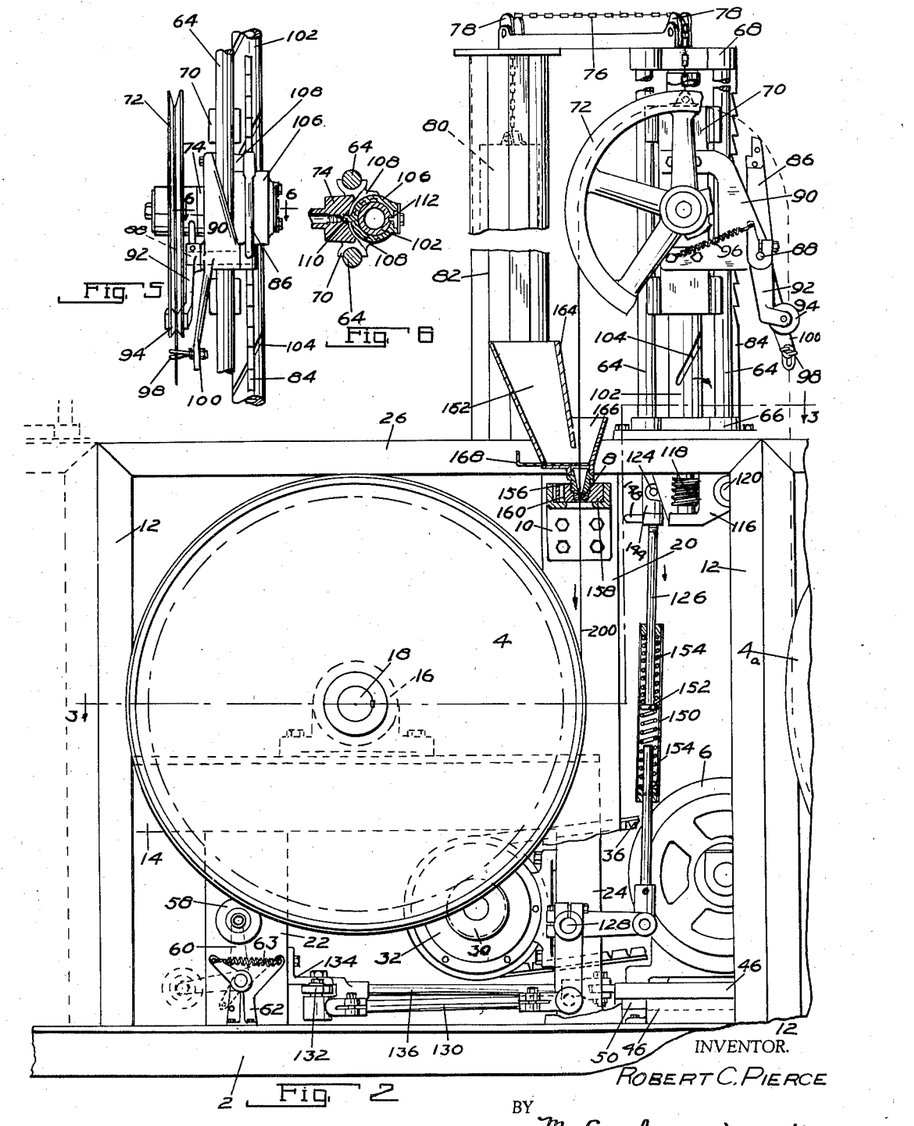
Figure 2 is an elevation on an enlarged scale of the intermediate unit as illustrated in Figure 1.
Figure 5 is a broken elevational view of the wire tensioning mechanism of the unit illustrated in Figure 2.
Figure 6 is a section on the line 6—6 of Figure 5.

The capstan is driven by a large herring-bone gear 28 keyed to the shaft 18 and driven by a pinion 30 on the shaft of a small planetary speed reducer 32 bolted to the angle 24. The reducer, in turn, has keyed to its transmission shaft 33 a pulley 34 engaged by a belt 36 driven by a motor 6, the power shaft of which is provided with a variable speed pulley 38 consisting of a cone member 40 fixed to the motor shaft 44 and a similar member 42 slidably keyed on said shaft and urged toward member 40 by a strong spring 43.

Speed variation is accomplished by shifting the motor 6 transversely to vary the distance between the pulleys 34 and 38 resulting in drawing the belt 36 toward the motor shaft 44, spreading the cone members and decreasing the effective pulley diameter, or vice versa. The motor is mounted on one of two cooperating slide members 46 the other of which is suitably fastened to an extension of the base 2. These members have respectively a groove or way 48 and a cooperating projection 50 (see Figure 2) disposed angularly so that when the motor 6 is shifted it is moved both transversely and axially in order that the fixed pulley cone member 40 and the slidable member 42 are disposed equally on the belt center line regardless of the motor position.

The capstan 4 is provided with a broad cylindrical peripheral surface having at its inner edge a flange 52 faired into the cylindrical surface by a wide radius in order that successive turns of wire coming onto the capstan adjacent the flange may force the preceding turns outwardly. In operation the wire is wrapped around the capstan several times and friction is depended upon to drive the wire.

To prevent the wire from unwrapping from the capstan in event of breakage or slack in the wire, a rubber roller 58 is rotatably mounted on one arm of a bell crank 60 pivoted on a bracket 62 bolted to the base 2. The other bell crank arm carries one end of a spring 63, the other end of which is attached to a projecting arm of the bracket. The spring holds the roller firmly against the turns of wire on the wheel 4. When desired the machine operator may thrust the roller out of engagement with the capstan and the spring is so arranged that it swings past the pivot center of the bell crank 60 holding the roller in disengaged position as shown in dotted lines in Figure 2.

Figures 2A, 2B, 3A, 3B:
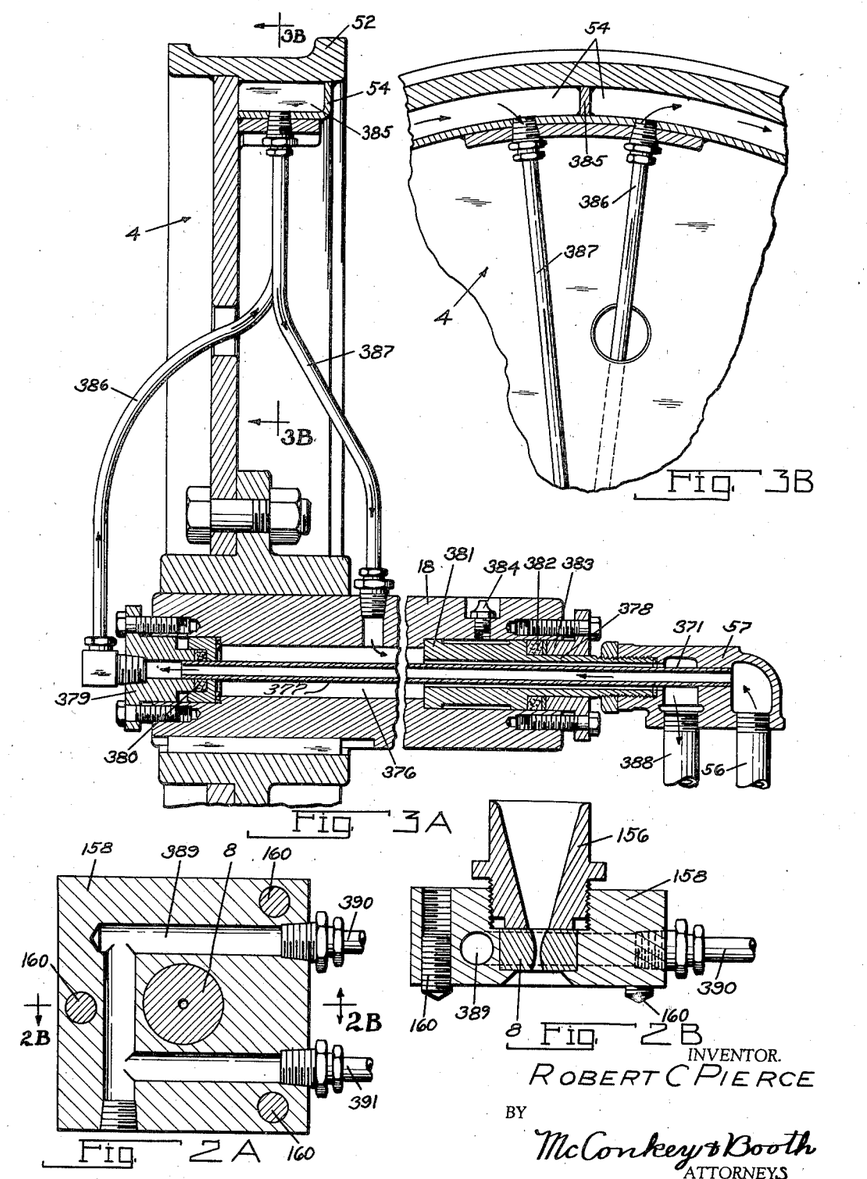
Figure 2A is a horizontal section through the die block showing the water passages for cooling the die.
Figure 2B is a vertical section on the line 2B—2B of Figure 2A.
Figure 3A is an axial section through the capstan and its shaft showing the water circulating means therein.
Figure 3B is a section on the line 3B—3B of Figure 3A.

The wire comes from the die in a highly heated condition, and a water jacket 54, in which cooling water may be circulated, is provided on the capstan. Figures 3A and 3B illustrate one method of introducing and circulating water therein. In these figures the shaft 18 is provided with a bore 376. Projecting forwardly into this bore at one end are two tubular members 377 and 378 which are also concentrically secured in a novel fitting 57 non-rotatably fastened to the machine frame. This fitting is so arranged that water, introduced through a pipe 56 connected thereto, enters only the inner concentric tube 377, and water draining from the system through the concentric tube 378 leaves by the pipe 388.

The tube 377 is supported at the opposite end of the shaft bore by a gland 379 which serves to compress a packing 380 sealing the tube 377 from the bore 376 and closing the end of the bore. The second tubular member 378 communicates directly with the bore 376 and has an enlarged end 381 which bears in said bore and is held and sealed therein by another packing 382 and gland 383. Lubrication at this end is provided by a fitting 384.

To insure circulation a partition 385 is placed in the jacket 54. Water is introduced on one side of this partition from a tube 386 connected to the tube 377 through the gland 379. The water passes completely around the capstan, insuring excellent cooling, and leaves it through a tube 387 on the other side of the partition 385. This tube 387 communicates with the bore 376 of the shaft and the water goes from there through the tubular member 378 to the fitting 57, and thence into the drain pipe 388.

The slack take-up and pre-tensioning device comprises a parallel spaced pair of cylindrical guide rods 64 rigidly mounted at their lower ends in a bracket 66 and extending vertically upward. The member 68 connects their upper ends.

Slidably mounted between the rods and provided with semi-cylindrical bearing surfaces cooperating therewith is an auxiliary frame such as a slide 70 having a central boss 74 on which is rotatably mounted a sheave 72. The wire being drawn passes vertically upward from the capstan of the preceding unit and is festooned over the sheave 72 and from these passes vertically downward through the die 8 and onto the capstan 4 of the next unit.

A chain 76 secured to the slide 70, passes upwardly to the rear and downwardly over a pair of pulleys 78 and has suspended on its end a weight 80 slidably housed in a tube 82 extending upwardly from the floor. The weight urges the slide 70 upwardly to tension the wire and take up any slack therein.

In order that the slide may not be thrown violently upward in case the wire breaks, a ratchet rack 84 is provided paralleling one of the rods 64. A pawl 86 adapted to cooperate therewith it attached to a shaft 88 journalled in a bracket 90 bolted on the slide 70. Extending down from the shaft 88 is an arm 92 carrying a small idler sheave 94 which engages the wire being drawn and holds the pawl out of engagement with the rack. Tensioned between the bracket 90 and a projection of the arm 92 is a spring 96 the force of which is insufficient to overcome the wire tension but which swings the pawl into engagement with the rack if the wire breaks. A wire guide 98 is mounted on a downwardly extending arm 100 of the bracket 90.

Rotatably mounted in bearings in members 66 and 68 and paralleling the rods 64 is a tube 102 in which is formed, throughout at least the major part of its length, a large-pitch right-hand spiral groove 104. A cylindrical sleeve 106 closely surrounds this tube and is shiftably engaged at its top and bottom by integral forks 108 on the slide 70 so as to move up and down therewith. A projection 110 on the front of the sleeve 106 engages a corresponding slot in the slide 70 preventing rotation of the sleeve relatively thereto, and secured in a recess in the sleeve 106 is a member 112 provided with a tongue engaging the spiral groove 104 and adapted to rotate the tube when the slide and sleeve are shifted up or down.

Figures 3, 4:
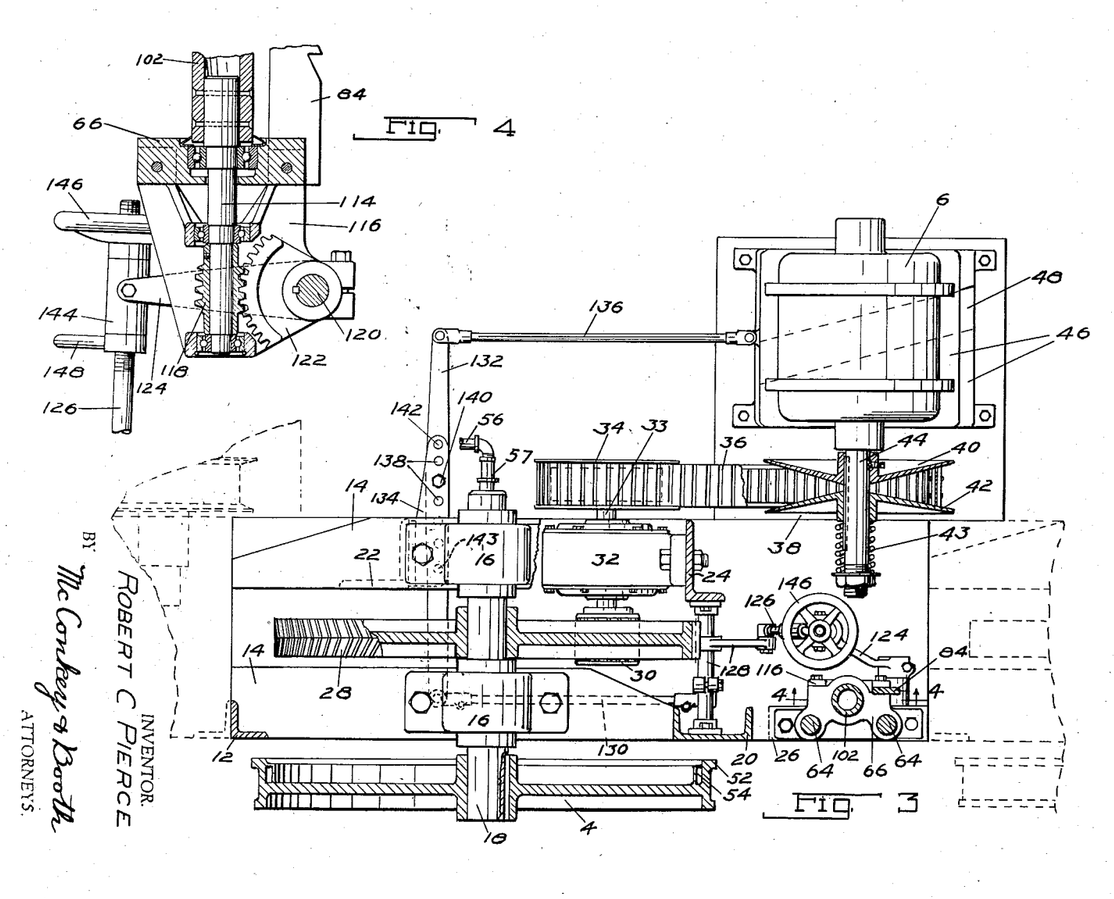
Figure 3 is a section on the line 3—3 of Figure 2.
Figure 4 is a section on the line 4—4 of Figure 3.

Rigidly secured to the bottom of the tube 102 is a stub shaft 114 journalled in anti-friction bearings in a bracket 116 bolted to the bracket 66 (see Figure 4). The shaft 114 is provided with a right hand worm gear 118. A rock shaft 120 journalled in bearings in the bracket 116 has secured thereto a worm wheel segment 122 meshing with the worm 118, and a lever 124 having a forked end (see Figure 3).

Rocking movement of the lever 124 is transmitted to the motor 6 to shift it and adjust the speed at which the capstan is driven. This is accomplished through a tie-rod 126, a rock shaft 128 journalled between the frame members 20 and 24 and levers carried thereby, a tie-rod 130, a rock lever 132 fulcrumed on a bracket 134 secured to the frame member 22, and a tie rod 136 attached to the movable motor slide member 46. Thus when capstan 4 is running too fast, the slide 70 is pulled down, rotating tube 102 and the worm 118 to the right, rotating segment 122 counter-clockwise, and through the linkage 126, 128, 130, 132, 136, shifting the motor 6 to the right (Figure 2) thereby decreasing the speed at which capstan 4 is driven. When the capstan 4 is rotating too slowly these members move in the opposite direction causing an increase in speed.

The rock lever 132 and its bracket 134 are each provided with several pivot holes 138. By placing a pivot pin 140 in different ones of these holes the range of speed adjustment for full movement of the slide 70 may be increased or decreased, e. g. if the pivot pin is in hole 142, full movement of the slide 70 may vary the speed of the capstan 4 from 30 R. P. M. to 40 R. P. M., and if pin 140 is placed in the hole 143, full movement of the slide 70 may vary the speed from 15 to 55 R. P. M. (other conditions being the same).

Another adjustment is incorporated on rod 126, the upper end of which is threaded and passes through a sleeve 144 pivoted on the forked end of arm 124. A tapped adjusting wheel 146 is screwed on the rod 126 above the sleeve and a lock nut 148 having a handle is screwed on below the sleeve so that the effective length of rod 126 may be adjusted.

It will be seen that this permits the position of the slide 70 relative to the guide rods 64 to be varied manually without altering the speed; or, in another sense, it results in shifting the range of speeds obtained for full movement of the slide 70, e. g. in one adjusted position of rod 126, the capstan 4 may vary in speed from 15 R. P. M. to 25 R. P. M. when the slide is moved from its lowest to its highest position, and adjusting the rod 126 to a new position may result in varying the speed of the capstan 4 from 25 R. P. M. at the lowest slide position to 35 R. P. M. at the highest position. These adjustments are highly desirable in order to give the machine a greater degree of sensitivity than would be obtainable if the full slide movement shifted the motor 6 through the entire range permitted by the variable speed pulley 38.

The tie-rod 126 is preferably constructed in two parts, to the lower one of which is secured a tubular casing 150. The upper part of rod 126 is slidably bushed in the upper end of the casing 150 and projects about half way thereinto where it terminates in a flange 152. A pair of compression springs 154 in the tube 150 thrust against opposite faces of this flange so that the assembled rod 126 resiliently extends or shortens against the resistance of one or the other of these springs. This construction permits the slide 70 to move rapidly and more or less independently of the inertia of the motor 6 and its shifting mechanism, and consequently reduces the possibility of wire breakage.

Variable speed pulleys of the type illustrated accommodate themselves slowly to speed increases as the belt must work itself out between the cones. The above-described resilient mechanism accelerates this by shifting the motor rapidly to its new position when the force exerted by the springs 154 becomes great enough to overcome the starting friction of the motor slide. The sudden loosening of the belt 36 and the action of centrifugal force thereon throws the belt out on the pulley and results in rapid speed changes.

As above stated the die holder 10 is rigidly secured to the channel frame member 20 by bolts or the like. A threaded sleeve 156, having a tapered bore for the wire to pass through, secures the die 8 in a die block 158 removably supported by the holder 10 and slidable therein in a horizontal plane so that the die opening may be automatically alined with the peripheries of the capstan 4 and the sheave 72 between which the wire which is being drawn is stretched. The die block 158 has three vertically disposed set screws 160, threaded therein in spaced positions adjacent its periphery, by means of which the die block may be adjusted to any angle with the horizontal in the event the die 8 is not bored exactly perpendicularly to its face.

The die block 158 is preferably made of materials, such as copper, having high heat conductivity and drilled or cored passages 389 such as are illustrated in Figures 2A and 2B are provided for the circulation of cooling water. Water may be introduced through a tube 390 and drained through another tube 391 and it will be noted that a closed system is maintained at all times even when a die is being replaced.

A novel lubricating soap container is adapted to slip onto the upper portion of the sleeve 156. It has a large bin 162 for soap at one side of the wire and the soap automatically feeds therefrom beneath a partition 164 (see Figure 2) into a smaller container 166 through which the wire passes. This construction permits deteriorated soap to be removed from the container 166 and prevents the soap in bin 162 from being contaminated thereby. A slide 168 is provided to close the opening in the bottom of the container so that it may be removed without spilling the soap when the operator is replacing or adjusting the die.

As stated above, a machine embodying my invention may comprise several units similar to that just described, the first of which may receive wire from a swift or a reel 170, and an idler sheave 172 may be provided to guide the wire onto the first sheave 72. Speed control of the first unit is preferably manual, a crank 173 being provided to shift the motor 6. By varying the speed at which the first unit is run, the speeds of all the units are varied accordingly and the operator can thus adjust the machine so that no unit runs at a speed greater than is permissible for maximum die life and efficiency. Except for the omission of the automatic speed control, the first unit is substantially identical with the intermediate units.

Figures 6, 7:
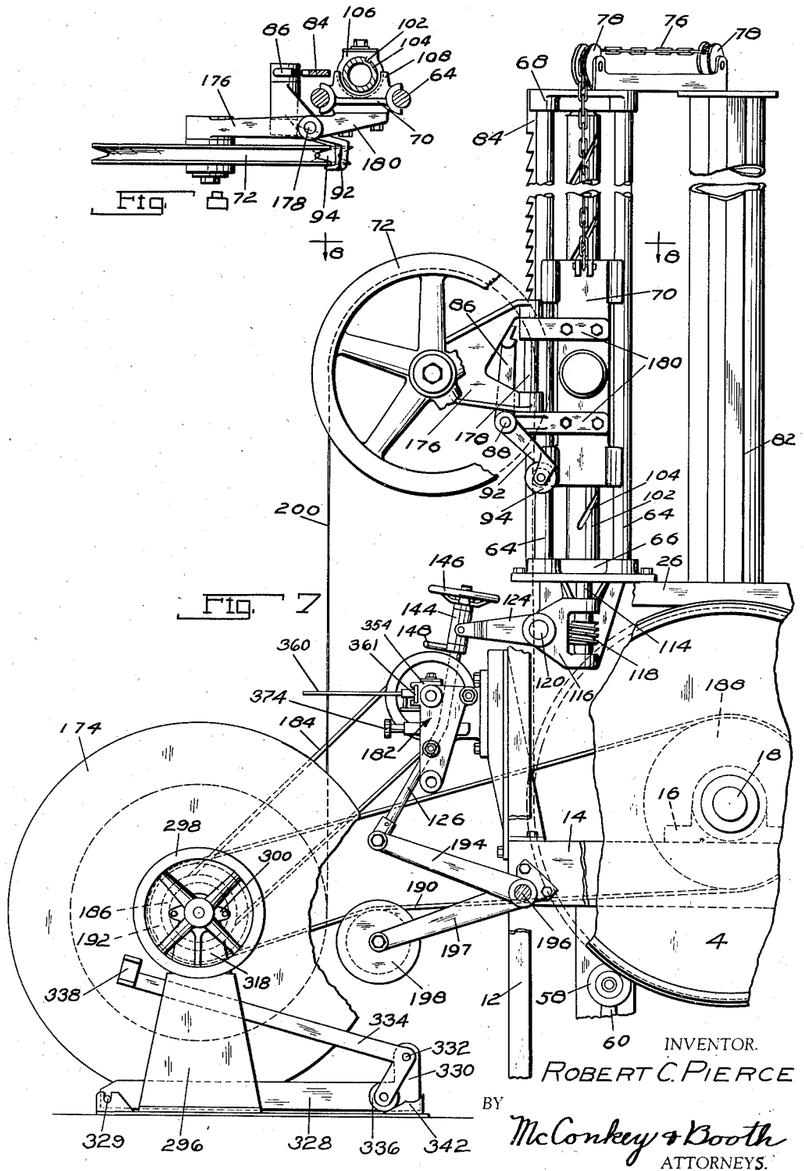
Figure 7 is a partial view of the last or left hand unit shown in Figure 1 and illustrates the wind-up mechanism, the level winding mechanism and another wire tensioning mechanism.

The last unit of the machine, a part of which is illustrated in Figures 7 and 8, is provided with two guides and slides, the additional one being mounted on the left hand side of the frame and adapted to receive wire from the capstan 4, to control the speed of a reel 174 on which the wire is wound and maintain constant tension in the wire being wound on the reel. This sheave 72 is mounted on an arm 176 swingably mounted on a vertical pivot 178 adjacent to the periphery of the sheave. The pivot 178 is journalled in brackets 180 bolted to the slide 70. This construction permits the wire to be fed onto the reel 174 through a level-winder 182 secured to the frame member 12 and driven by belt 184 from a pulley 186 on the reel. A pulley 188 on the capstan shaft 18 carries a slack belt 190 running on a pulley 192 which drives the reel.

Movement of the slide 70 rotates the tube 102 and left-hand worm 118 which cooperates with a worm wheel segment (not shown) mounted on a shaft 120 to which is also attached an arm 124. This construction is substantially that of the other slides and results in counterclockwise movement of the arm 124 when the slide moves down. An adjustable tie-rod 126 connects the arm 124 with a lever 194 secured to a rock shaft 196 journalled in bearings between the frame members 14. An arm 197 keyed to the shaft 196 carries an idler pulley 198 which engages the belt 190. When the reel is rotating faster than wire is supplied, slide 70 is pulled downwardly swinging the pulley 198 away from the belt and thereby loosening it and permitting it to slip so that the reel is driven more slowly. Opposite slide movement increases the tension of the belt 190 and the speed of the reel 174.

Figures 7, 17, 18 and 19 illustrate my novel reel mounting. The reel 174 is provided with a central bore 286 and is supported on opposite sides by stub shafts 288 and 290 projecting into the bore. The stub shaft 288 is freely mounted on ball bearings on the end of a shaft 292 keyed against rotation but slidably mounted in the bore of a bracket 294 bolted on a pedestal 296. A hand wheel 298, rotatably supported on a yoke 300 bolted to the bracket 294 is provided with a screw-threaded shaft 301 engaging a coaxial tapped bore in the shaft 292 so that rotation of the hand wheel slides the shaft 292 in the bracket to force the stub shaft 286 into or withdraw it from the bore of the reel.

Figure 17:
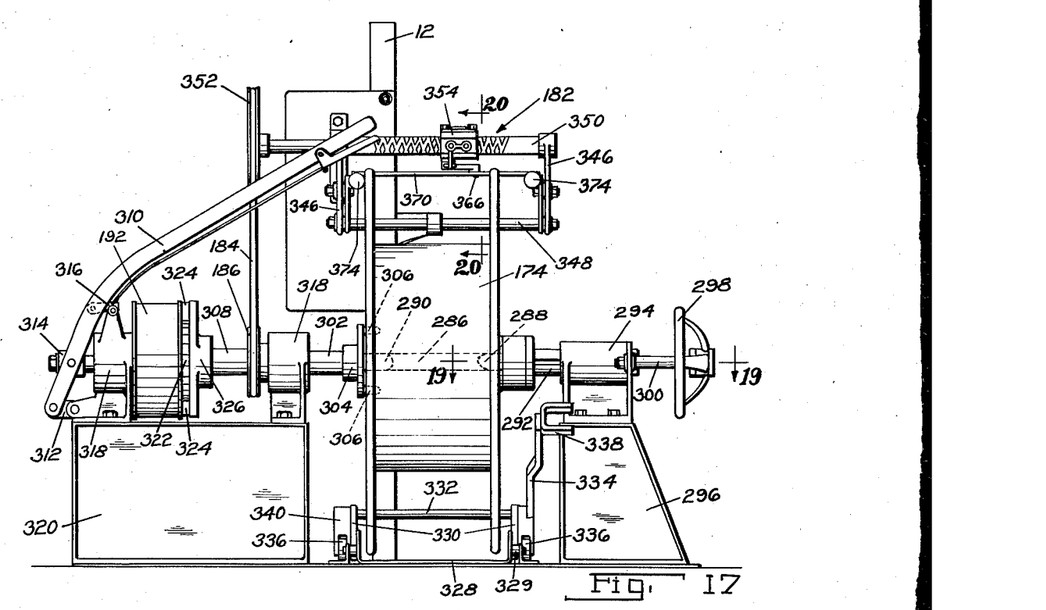
Figure 17 is a partial end elevational view of one of my machines illustrating particularly the level-winding and wind-up mechanisms.
Figure 18:
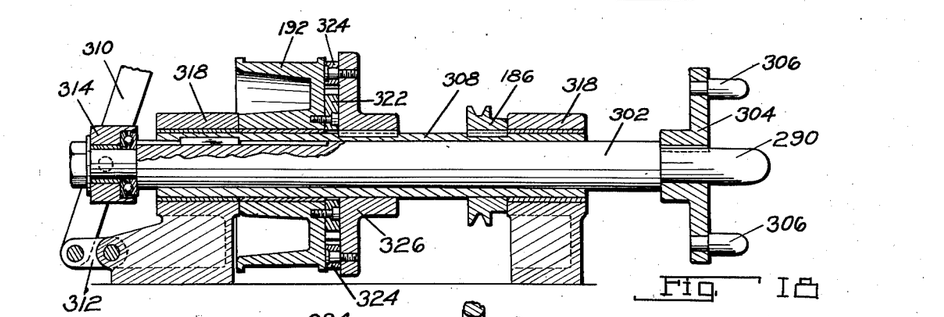
Figure 18 is a vertical longitudinal section through a portion of the wind-up mechanism.
Figure 19:
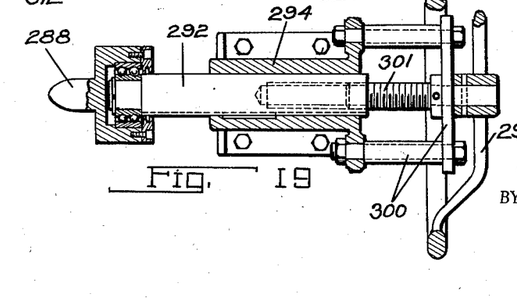
Figure 19 is a section of the line 19—19 of Figure ure 17 showing details of the wind-up mechanism.

The stub shaft 290 on the other side of the reel is formed integrally with a shaft 302 and has keyed to it a flanged hub 304 provided with a pair of driving projections or pins 306 adapted to drivably engage a pair of holes in the side of the reel. The shaft 302 is keyed in a sleeve 308 so as to rotate therewith but be axially movable therein, and a lever 310, swingably mounted on a link 312 and pivoted to a collar 314 rotatably secured to the shaft, serves to shift it axially within the sleeve to move the stub and driving projections into or withdraw them from the reel. A latch 316 on the lever 310 holds the lever and shaft in position when the reel is mounted.

The sleeve 308 is rotatably supported at opposite ends in a pair of pillow blocks 318 mounted on a pedestal 320 and has the level winder drive pulley 186 keyed thereon and the reel drive pulley 192 freely mounted thereon. A ratchet wheel 322, secured to the pulley 192 by screws or the like, drivably engages a pair of pawls 324 mounted on a flange 326 keyed to the sleeve.

In order to raise the reel into a position coaxial with the stubs, a novel elevator is provided which consists of a channel member 328, wider than the reel, mounted at one end in a horizontal position and just clear of the floor on pivots 329 and having its other end resting on the floor and provided with upright projections 330 in which is journalled a cross shaft 332. A bell crank lever 334, one arm of which is forked and carries a roller 336 and the other arm of which extends at a slight incline to a position adjacent the pedestal 296 where it terminates in a pedal member 338, is rigidly secured to one end of said shaft, and a lever 340 carrying another roller 336 is rigidly mounted on the other end of said shaft. The rollers are adapted to move up inclined cam members 342 when the pedal is depressed, and arcuate depressions at the top of the cam members hold the rollers in elevated position.

In mounting a reel the pedal is depressed raising the channel to an inclined position, the empty reel is rolled up the channel into position, and the lever 310 and hand wheel 298 are operated to insert the stub shafts 288 and 290 into the central bore of the reel. The pedal is then raised, lowering the channel and leaving the reel suspended on the stubs. It will be noted that the ratchet 322 and pawls 324 permit the shaft 302 to be rotated to index the driving projections 306 with the corresponding holes in the reel and also permit rotation of the reel by hand to take up any slack in the wire before starting the machine.

When the reel is full of wire, the pedal is again depressed so as to raise the channel 328 and lift the reel. The stubs are withdrawn and the reel rolled out on the floor.

Figures 20, 21, 22:
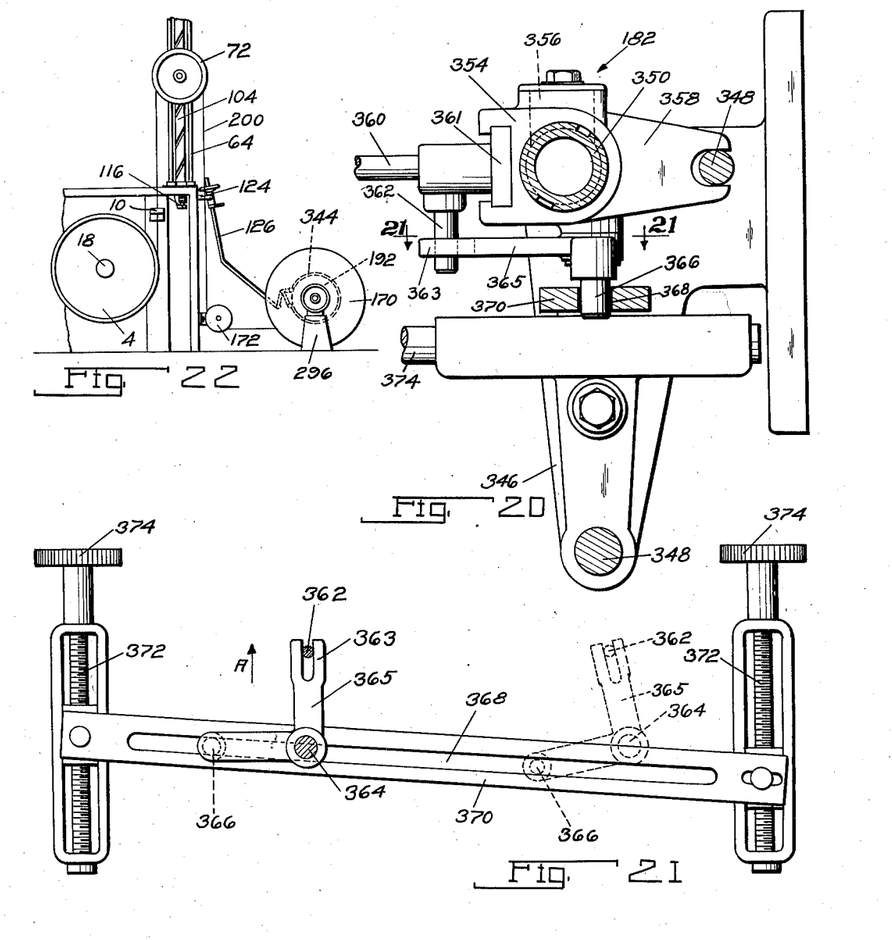
Figure 20 is a section on the line 20—20 of Figure 17 showing details of the level-winding mechanism.
Figure 21 is a section on the line 21—21 of Figure 20 with parts omitted.
Figure 22 is a partial front elevation of the first unit of a machine similar to that of Figure 1 illustrating a different feed reel mounting employing a brake.

As shown in Figure 22 a similar reel mounting might be employed for the reel 170 which supplies wire to the machine. This reel would not be driven, but would preferably be provided with a brake 344. This brake might be mounted so as to employ the pulley 192 as a brake drum and could be automatically applied by a rod 126 operated by movements of the pulley 72 on the guide rods 64 of the first unit of one of my machines. By this construction a constant pre-loading can be applied to the wire as it enters the first die.

The level winder 182 comprises a pair of end plates 346, spaced by rods 348. A right and left hand threaded shaft 350 is journalled in these plates and rotated by the belt 184 running on the pulley 352.

A sleeve member 354, mounted on the shaft 350, has the usual tongued member 356 engaging the threads so as to cause the sleeve to reciprocate on the shaft, and the sleeve is prevented from rotating with the shaft by a forked projection 358 engaging one of the rods 348. The wire guide 360 is mounted on an auxiliary slide 361 reciprocably mounted in ways cut in the sleeve member 354. A pin 362 projecting downwardly from the slide 361 is embraced by the forked end 363 of a bell-crank lever 365 pivoted at 364 on the slide mmeber 354. The other arm of this bellcrank is provided with a pin 366 adapted to travel in a long slot 368 in a bar 370 adjustably mounted at each end on screws 372 and adapted to be shifted thereon by rotating knurled knobs 374.

By the above construction the movement of the wire guide 360 can be varied to comply with variations in the width and mounting of the reel 174. Figure 21 by showing two positions of the bellcrank illustrates how an angular setting of the bar 370 rotates the bell crank. Rotation of the bellcrank shifts the slide 360 relatively to the sleeve 354, and depending upon the direction of movement of the sleeve and the slide 360, this movement is added or subtracted from the normal traverse of the sleeve and makes the traverse of the guide 360 greater or less. By shifting the bar bodily forward in the direction of arrow A (Figure 21) or to the rear, the limits of the movement of the wire guide are both shifted to the right or to the left respectively. An angular setting, such as that of Figure 21, reduces and an opposite angular setting increases the distance traveled by the wire guide.

The operation of my novel machine is as follows:

A wire 200, which is to be drawn, is passed under the sheave 172, over the sheave 72, down through the first die 8, and is wrapped several times around the capstan 4 of the first unit. Individual switches for each of the motors 6 may be provided to facilitate threading a wire onto the machine, and a master switch for all motors may be provided for subsequent operation.

The end of the wire is led from the capstan 4 of the first unit and threaded in the same manner on each successive unit until in the last unit it is passed over the last sheave 72, then down through the level winder 182 and onto the reel 174. When the machine is completely threaded and in operation, the tie-rods 126 are adjusted by wheels 146 so that the sheaves 72 balance approximately in the centers of the guides 64 in order that the maximum movement in either direction is available for emergency speed variation. The adjustment of the pivot pins 140 on the rock levers 132 probably will not need to be altered once a favorable position for each unit is determined. Each succeeding unit runs faster than the preceding one because of the increase in the length of the wire after passing each die, and each unit accurately adjusts its speed in accordance with the rate at which it receives wire from the preceding one.

It will be noted that the wire entering each die is under a heavy back tension, making it relatively easy to insure that the wire is accurately centered in the die, there being no slack or backlash ahead of the die. The back tension, as previously explained, also lessens the force necessary to draw the wire through the die. The back tension being balanced out by the tension drawing the wire through the preceding die, does not add to the power required, but in fact is found to reduce it by reason of the greater ease of drawing through the die.

In the embodiment of Figures 9 to 14 only a portion of an intermediate and the last unit are illustrated. A complete machine would be arranged in substantially the same manner as that of the previously described embodiment. In these figures similar parts are designated by the same reference numerals as those in Figures 1 to 8.

Figures 9, 14:
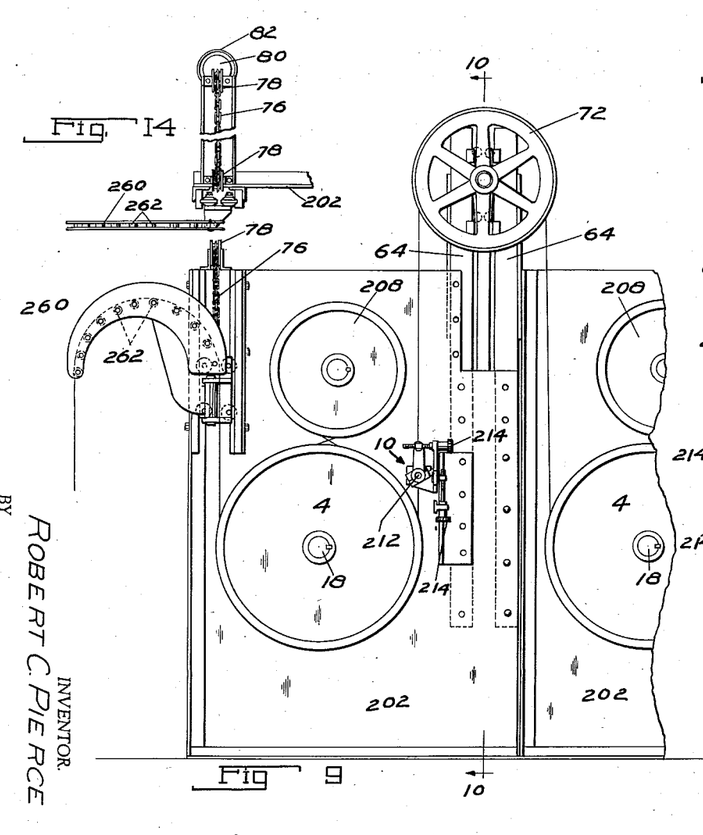
Figure 9 is a broken front elevational view showing parts of an intermediate and the last unit of another embodiment of my invention.
Figure 14 is a partial plan view of Figure 9.

A front plate 202 and a rear plate 204, interconnected by a platform 206 make up the frame. A large gear box 32 is mounted on the platform 206 and has a shaft 18 on which is mounted the capstan 4. The capstan may, if desired, have a plurality of grooves each of which is adapted to carry a single turn of wire and the wire is fed from groove to grooves by passing it in loops, or if preferred in the form of figures 8 around another grooved wheel 208 attached to a freely rotatable shaft 210 journalled in bearings attached to the frame plates 202 and 204.

The die-holder 10 is mounted on trunnions 212 disposed at right angles in the horizontal plane, and knobs 214, having screws cooperating with nuts on the die-holder, are provided to adjust the plane of the holder.

Figures 10, 13:
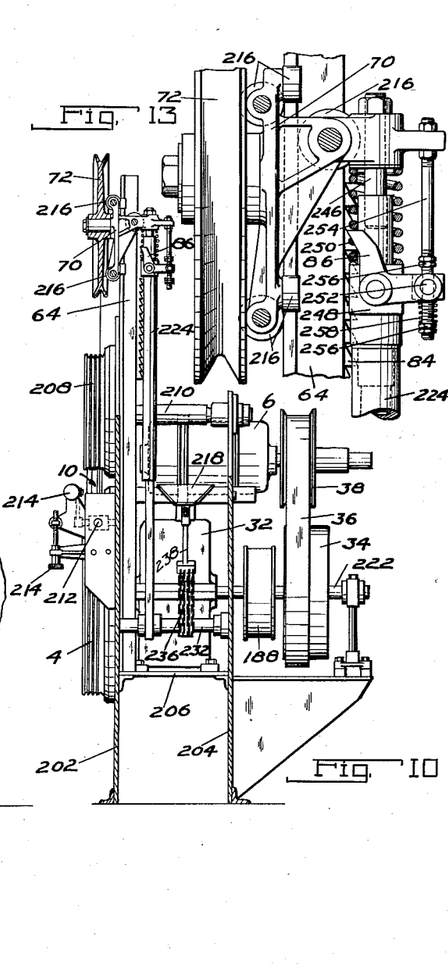
Figure 10 is a section on the line 10—10 of Figure 9.
Figure 13 is a partial view on an enlarged scale of the tensioning device in Figure 10.

The guides 64 are made of angle irons and the slide 70 is provided with rollers 216 arranged, as clearly illustrated in Figure 13, to permit the slide to move freely on the guides. The sheave 72 is mounted similarly to that in the previously described embodiment and serves the same purpose.

The motor 6 is mounted on one end of a platform 218 arranged to swing in a vertical plane on a pivot 220 located adjacent the other end of the platform and journalled in the frame plates. The variable speed pulley 38 on the motor shaft drives the V-belt 36 and the pulley 34 attached to a shaft 222 of the speed reducer 32.

Figure 11:
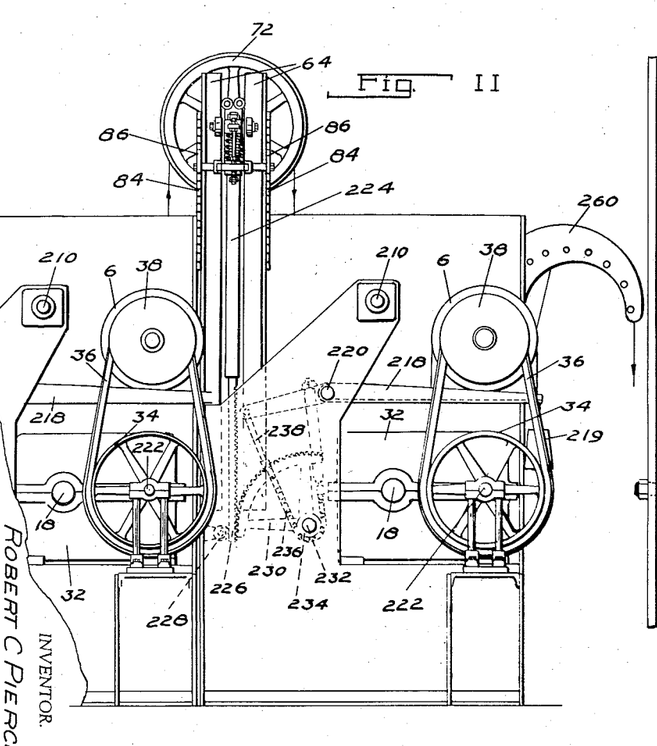
Figure 11 is a rear elevation corresponding to Figure 9.

It will be seen that if platform 218 is moved about its pivot 220, the motor 6 will be raised or lowered and the speed of the shaft 222 will be varied through the agency of the pulley 38. Movement of the platform is accomplished by a push-pull rod 224 engaged by the slide 70 at its upper end and provided at its lower end with a rack 226, the rear face of which is supported by a roller 228 bracketed to the frame, and the toothed face of which engages a spur gear section 230 fixed to a shaft 232 journalled between the frame plates 202 and 204. The shaft 232 carries a sprocket 234 having three rows of teeth about which is passed a triple chain 236, one end of which is adjustably connected to the end of the platform 218 opposite the motor 6 by a tension rod 238 having a threaded end passing through a block 240 pivoted on the platform. Lock nuts 242 hold the rod in adjusted position in the block 240. The chain 236 is held in engagement with the sprocket 234 by a coiled tension spring 244 attached to the other end of the chain and to the platform 218.

Figure 12:
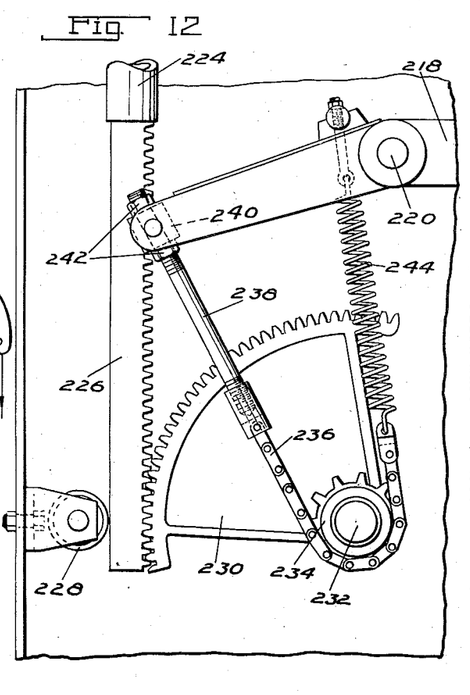
Figure 12 is a broken view on an enlarged scale of the wire tensioning and speed control operating mechanism of Figure 9.

From the above description and by referring to Figures 11 and 12, it will be seen that a downward movement of the slide 70 due to an increase in the tension of the wire on the sheave 72 will cause the rod 224 and the rack 226 to rotate the gear sector 230 in a counterclockwise direction, and through the sprocket 234 and the chain 236, will swing the platform 218 in a counter-clockwise direction, raise the motor, and draw the belt 36 into the pulley 38 to reduce the speed at which the capstan 4 is driven.

In this embodiment the weight of the motor 6 on the end of the pivoted platform 218 replaces the wire-tensioning weights employed in the previously described embodiment, and if greater tension is desired, additional weights 219 may be suspended from the end of platform 218. No adjustment is provided, in the particular arrangement shown, for increasing or decreasing the range of speed variation, but nuts 242 provide an adjustment for shifting the range of speed variation.

The slide 70 is provided with a stub shaft 246 slidable in a bore in the upper end of the rod 224 and acting as a guide therefor. A sleeve 248 secured to the rod 224 acts as an abutment for a compression spring 250 which urges the slide away from the rod 224. Pivoted on opposite sides of this sleeve are pawls 86 (Figure 11) adapted to engage corresponding ratchet racks 84 and provided with bell crank arms projecting rearwardly and connected by a common cross-member 252. A rod 254, secured to the slide 70, passes through an opening in this cross-member and has threaded thereon two pairs of nuts 256, one pair above member 252 and one below.

As long as a wire is tensioned over sheave 72, the spring 250 is compressed and the upper pair of nuts 256 engages the cross-member 252 and holds the pawls out of engagement with the racks. If the wire breaks, spring 250 throws the slide 70 upward and the lower pair of nuts 256 engages the cross-member 252 through a light coiled spring 258 and swings the pawls into engagement with the racks, thereby preventing the slide 70 from being thrown violently to the top of the guides.

The last unit is provided with a slide mounted tensioning member 260 (Figures 9 and 14) swingable about a vertical pivot and comprising a pair of generally crescent shaped plates spaced by riveted pivots carrying small rollers 262 arranged in a semi-circle and over which the wire passes from the capstan 4 to the wind-up reel (not shown).

Figure 15:
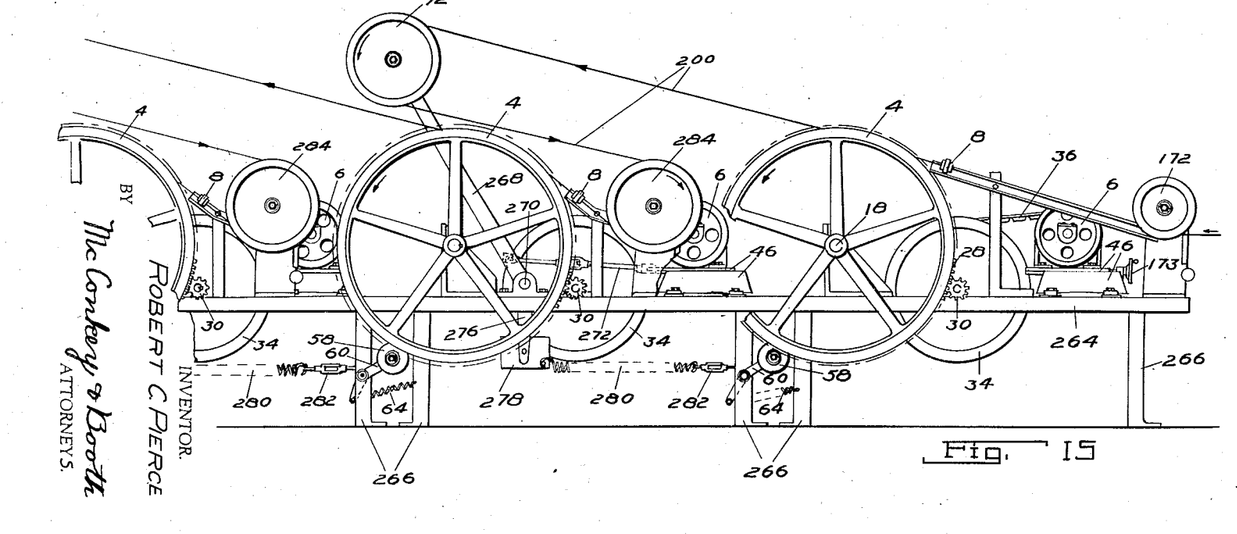
Figure 15 is a front elevation of another embodiment of my invention.
Figure 16:
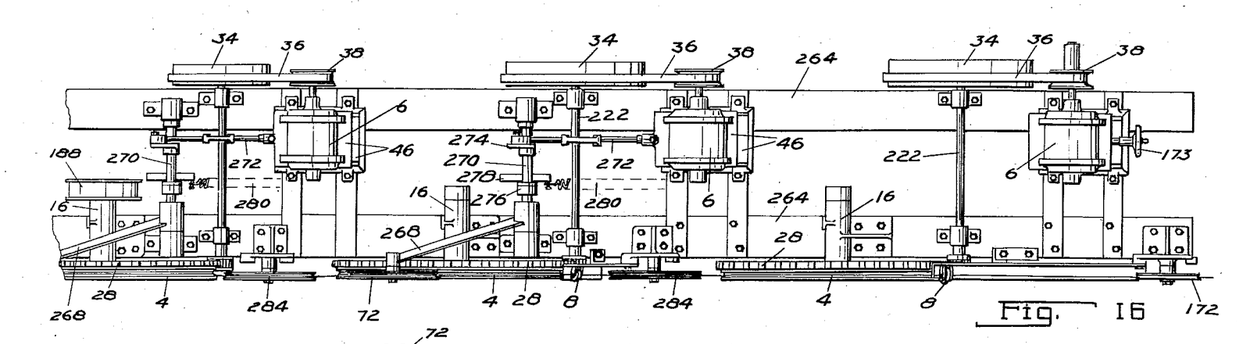
Figure 16 is a plan view of that embodiment.

The embodiment illustrated in Figures 15 and 16 (in which parts corresponding to those of the preceding embodiments are given like reference numerals) is provided with a frame comprising two parallel channels 264 supported by a number of legs 266. The motors 6 provided with the variable speed pulleys 38 drive pulleys 34 mounted on shafts 222 to which shafts are attached pinions 30 meshing with gears 28 formed integrally with the capstans 4. Capstans 4 are journalled in bearings 16 bolted to the channel frame members.

Sheaves 72 are mounted on arms 268 instead of slides and these arms are secured to shafts 270 rotatably mounted in pillow blocks on the frame. Adjustable tie rods 272 secured at one end to arms 274 rigid with the shafts 270 are directly connected to the slide members 46 on which the motors are shiftably mounted.

Each of shafts 270 has rigid therewith a downwardly projecting arm 276 which carries a weight 278. Springs 280 are stretched between these arms and the frame and are adjustable by means of turnbuckles 282. The weights 278 and springs 280 serve to preload the wire as it is being drawn.

Since sheaves 72 follow an arcuate path, the wire cannot be passed directly from them to the dies 8 and therefore fixed guide pulleys 284 are provided.

The operation of this embodiment is substantially the same as the others. A wire 200 is pulled from a swift or reel, under a guide pulley 172, directly through the first die 8 and onto the capstan 4 around which it is wound several times and from which it passes in a loop or festoon over the sheave 72 of the next unit, over the fixed guide pulley 284, into the next die 8 and so on until it has passed through any desired number of units.

In all of the embodiments it will be noted that the speed of the wire feeding means is varied automatically according to the tension of the wire, and also that by changing the speed of the first wire-feeding device 4 all the succeeding parts of the apparatus automatically change their speeds to correspond.

Advantage is taken of the variable nature of the wire feeding means, and its control by the tension on the wire, to secure in a simple but very effective manner the desired back tension on the wire which so greatly facilitates the operation of drawing it through the die.

While three illustrative embodiments have been described in detail, it is not my intention to limit the scope of the invention to those particular embodiments, or otherwise than by the terms of the appended claims. The features described above relating to the cooling of the capstans are claimed in my application No. 234,086, filed October 10, 1938, which is a partial continuation of this application. Various features described but not claimed herein are claimed in my divisional applications Nos. 232,266, 232,267, and 232,268, filed September 29, 1938, and No. 235,730, filed October 19, 1938.

I claim:

1. An apparatus for treating material in strip or wire form which is being delivered at a predetermined rate, said apparatus comprising a main frame, an auxiliary frame movably mounted on the main frame for vertical movement thereon, a weight connected to said auxiliary frame and urging it upwardly on the main frame, an angularly-movable member rocked by vertical movement of said auxiliary frame mechanism for feeding said material mounted on said frames and including a rotatable member journalled on the auxiliary frame and about which the material passes, a capstan mounted on a horizontal axis on the main frame below the auxiliary frame and receiving the material from said rotatable member, means to drive said capstan including a variable speed transmission mounted on the main frame and having a power shaft, a transmission shaft, and a variable speed driving connection between said shafts, and a mechanical connection between said angularly-movable member and said variable speed driving connection by which movement of the auxiliary frame induced by the change of tension to which said material is subjected actuates said variable speed driving connection to produce a compensating change in the speed of said capstan.

2. An apparatus for winding material in strip or wire form which is being delivered at a predetermined rate, said apparatus comprising a supporting frame, feed mechanism for said material including a rotatable member about which the material passes, an auxiliary frame carrying said member and mounted on the supporting frame for vertical movement, said auxiliary frame being adapted for movement on the supporting frame under tension of the material, a capstan mounted on a horizontal axis on the main frame below the auxiliary frame and receiving the material from said rotatable member, means for driving the capstan including a power shaft, a transmission shaft, and a variable speed driving connection between said power shaft and said transmission shaft, a control lever for adjusting said variable speed driving connection, means for connecting said lever to said auxiliary frame whereby movement of the auxiliary frame induced by an increased tension on the material effects an adjustment of the variable speed driving connection to decrease the speed of said feed mechanism and means operated automatically in case of breakage of said material to secure the auxiliary frame to the supporting frame to prevent vertical movement of the auxiliary frame.

3. An apparatus for winding material in strip or wire form which is being delivered at a predetermined rate, said apparatus comprising a main frame, feed mechanism including a rotatable member about which the material passes, an auxiliary frame on which said member is journalled and which is mounted on the main frame for vertical movement on the main frame and is adapted to be moved thereon by increased tension in the material, a capstan mounted on a horizontal axis on the main frame below the auxiliary frame and receiving the material from said rotatable member, means for driving the capstan including a power shaft, a transmission shaft, and a variable speed driving connection between said shafts and a connection between said auxiliary frame and the variable speed driving connection by which movement of the auxiliary frame induced by an increased tension in the material being wound adjusts said variable speed driving connection to reduce the speed of the feed mechanism, and means operated automatically in case of breakage of said material and acting to prevent movement of said auxiliary frame.

4. An apparatus for treating material in strip or wire form which is being delivered at a predetermined rate, said apparatus comprising a main frame, an auxiliary frame movably mounted on the main frame, mechanism for feeding said material mounted on said frames and including a rotatable member journalled on the auxiliary frame and about which the material passes, means to drive said mechanism including a variable speed transmission mounted on the main frame and having a power shaft, a transmission shaft, and a variable speed driving connection between said shafts, a mechanical connection between said auxiliary frame and said variable speed driving connection by which movement of the auxiliary frame induced by the change of tension to which said material is subjected actuates said variable speed driving connection to produce a compensating change in the speed of said material feeding mechanism, and a motor driving said power shaft and mounted so that its weight urges the auxiliary frame in a direction to increase the tension on said material.

5. An apparatus for winding material in strip or wire form comprising feed mechanism for the material, a movable roll over which the material passes, a variable speed means driving the feed mechanism, and a motor driving the variable speed means and connected to said roll so that the weight of the motor urges the roll in the direction of increasing the tension on said material and movements of said roll shift the motor, said variable speed means being controlled by the shifting of the motor.

6. An apparatus for treating material in strip or wire form which is being delivered at a predetermined rate, said apparatus comprising a main frame, an auxiliary frame movably mounted on the main frame, mechanism for feeding said material mounted on said frames and including a rotatable member journalled on the auxiliary frame and about which the material passes, means to drive said mechanism including a variable speed transmission mounted on the main frame and having a power shaft, a transmission shaft, and a variable speed driving connection between said shafts, a mechanical connection between said auxiliary frame and said variable speed driving connection by which movement of the auxiliary frame induced by the change of tension to which said material is subjected actuates said variable speed driving connection to produce a compensating change in the speed of said material feeding mechanism, a die through which the material is drawn by said mechanism, and a motor driving said power shaft and mounted so that its weight urges the auxiliary frame in a direction to increase the back tension on said material between the auxiliary frame and the die.

7. An apparatus for treating material in strip or wire form comprising feed mechanism for the material, a movable roll over which the material passes, a variable speed means driving the feed mechanism, a die through which the material is drawn by the feed mechanism, and a motor driving the variable speed means and connected to said roll so that the weight of the motor urges the roll in the direction of increasing the back tension on said material between the roll and the die and so that movements of said roll shift the motor, said variable speed means being controlled by the shifting of the motor.

8. Wire treating apparatus comprising a movable slide carrying a wire-tensioning device, means yieldingly urging the slide in a direction to tension wire engaged by said device, a rotatable member adjacent said slide provided with a spiral groove, a part carried by the slide and seated in said groove and turning said member as the slide moves, and feeding means for the wire having a speed-varying device controlled by the rotation of said member.

9. Wire treating apparatus comprising a die through which the wire passes, a capstan for drawing the wire through the die, a movable slide ahead of the die carrying a wire-tensioning device over which the wire passes to the die, means yieldingly urging the slide away from the die to tension wire engaged by said device, a rotatable member adjacent said slide provided with as piral groove, a part carried by the slide and seated in said groove and turning said member as the slide moves, and feeding means for the capstan having a speed-varying device controlled by the rotation of said member.

10. Wire treating apparaus comprising a movable slide carrying a wire-tensioning device, means yieldingly urging the slide in a direction to tension wire engaged by said device, a rotatable member adjacent said slide provided with a spiral groove, a part carried by the slide and seated in said groove and turning said member as the slide moves, and feeding means for the wire having a speed-varying device controlled by the rotation of said member, said apparatus having manually operable means for varying the position of the slide for a given speed of said feeding means.

11. Wire treating apparatus comprising a movable slide carrying a wire-tensioning device, means yieldingly urging said slide in a direction to tension wire engaged by said device, wire feeding means having a speed-varying device controlled by the position of said slide, and manually operable means for varying the position of the slide for a given speed of the feeding means.

12. Wire treating apparatus comprising a die, a capstan for drawing wire through the die, a movable slide carrying a wire-tensioning device over which the wire passes to the die, means yieldingly urging said slide away from the die to tension wire engaged by said device, a speed-varying device driving the capstan and controlled by the position of said slide and manually operable means for varying the position of the slide for a given speed of said capstan.

13. Wire treating apparatus comprising a horizontal die, a capstan for drawing wire vertically through the die, a vertically movable slide carrying a wire-tensioning device on the other side of the die from said capstan and over which the wire passes to the die, means yieldingly urging said slide away from the die to tension wire engaged by said device, and a speed-varying device driving the capstan and controlled by the position of said slide.

14. Wire treating apparatus comprising a movable slide carrying a wire-tensioning device, means yieldingly urging said slide in a direction to tension wire engaged by said device, wire-feeding means including a speed-varying device, and connections from the slide arranged to operate the speed-varying device and which connections include yielding means permitting the slide to take up new positions rapidly and yet operate the speed-varying device comparatively slowly.

15. Wire treating apparatus comprising a die, a capstan for drawing wire through the die, a movable slide carrying a wire-tensioning device over which the wire passes to the die, means yieldingly urging said slide away from the die to tension wire engaged by said device, a speed-varying device driving the capstan, and connections from the slide arranged to operate the speed-varying device and which connections include yielding means permitting the slide to take up new positions rapidly and yet operate the speed-varying device comparatively slowly.

16. Wire treating apparatus comprising a movable slide carrying a wire-tensioning device, means yieldingly urging said slide in a direction to tension wire engaged by said device, wire-feeding means including a speed-varying device, and connections from the slide arranged to operate the speed-varying device and which connections include yielding means permitting the slide to take up new positions rapidly and yet operate the speed-varying device comparatively slowly, said apparatus including manually operable means for varying the position of the slide for a given speed of the feeding means.

17. Wire treating apparatus comprising a die, a capstan for drawing wire through the die, a movable slide carrying a wire-tensioning device over which the wire passes to the die, means yieldingly urging said slide away from the die to tension wire engaged by said device, a speed-varying device driving the capstan, and connections from the slide arranged to operate the speed-varying device and which connections include yielding means permitting the slide to take up new positions rapidly and yet operate the speed-varying device comparatively slowly, said apparatus including manually operable means for varying the position of the slide for a given speed of the feeding means.

18. Apparatus for drawing wire comprising driven capstans all arranged in the same vertical plane, guides in the same plane and cooperating with the capstans to cause the wire to pass vertically downward to each capstan, a die arranged horizontally above each capstan and downwardly through which the wire is drawn by the corresponding capstan, means associated with said guides for creating a back tension on the wire as it enters each die, and cup means around the top of each of the dies for feeding a lubricating material by gravity into the mouth of each of said dies independently of the wire.

19. Apparatus for drawing wire comprising driven capstans all arranged in the same vertical plane, guides in the same plane and cooperating with the capstans to cause the wire to pass vertically downward to each capstan, a die arranged horizontally above each capstan and downwardly through which the wire is drawn by the corresponding capstan, and cup means around the top of each of the dies for feeding a lubricating material by gravity into the mouth of each of said dies independently of the wire.

20. Apparatus for drawing wire comprising a series of successively smaller horizontally arranged dies, feeding means below each die for drawing the wire vertically downward through that die, movable guide means above each die receiving the wire from the preceding feeding means and directing it downwardly to said die, means acting on each guide means to exert a back tension on the wire, and means for controlling the speed of the feeding means in accordance with movements of the guide means.

21. Apparatus for drawing wire comprising a series of successively smaller horizontally arranged dies, feeding means below each die for drawing the wire vertically downward through that die, means above each die receiving the wire from the preceding feeding means and directing it downwardly to said die, and cup means around the top of each of the dies for feeding lubricating material by gravity into the mouth of each of said dies independently of the wire.

22. Apparatus for drawing wire comprising a series of successively smaller horizontally arranged dies feeding means below each die for drawing the wire vertically downward through that die, movable guide means above each die receiving the wire from the preceding feeding means and directing it downwardly to said die, means acting on each guide means to exert a back tension on the wire, means for controlling the speed of the feeding means in accordance with movements of the guide means, and a device associated with each die for feeding a lubricant material thereto by gravity.

ROBERT C. PIERCE.